United States Patent
Sheinkman et al.

(10) Patent No.: US 11,505,868 B2
(45) Date of Patent: Nov. 22, 2022

(54) COMPOSITE PHOSPHATE COATINGS

(71) Applicant: PHOSFAN LTD., Barkan (IL)

(72) Inventors: Avraham Sheinkman, Ariel (IL); Itzhac Rozentul, Ariel (IL)

(73) Assignee: PHOSFAN LTD., Barkan (IL)

( * ) Notice: Subject to any disclaimer, the term of this patent is extended or adjusted under 35 U.S.C. 154(b) by 220 days.

(21) Appl. No.: 15/773,170

(22) PCT Filed: Nov. 7, 2016

(86) PCT No.: PCT/IB2016/056682
§ 371 (c)(1),
(2) Date: May 3, 2018

(87) PCT Pub. No.: WO2017/077514
PCT Pub. Date: May 11, 2017

(65) Prior Publication Data
US 2018/0320269 A1 Nov. 8, 2018

Related U.S. Application Data

(60) Provisional application No. 62/251,147, filed on Nov. 5, 2015.

(51) Int. Cl.
*C23C 22/78* (2006.01)
*C09C 1/62* (2006.01)
(Continued)

(52) U.S. Cl.
CPC ............... *C23C 22/78* (2013.01); *C09C 1/62* (2013.01); *C23C 22/07* (2013.01); *C23C 24/00* (2013.01);
(Continued)

(58) Field of Classification Search
CPC ......... C23C 22/78; C23C 22/07; C23C 24/00; C23C 30/00; C09C 1/62
See application file for complete search history.

(56) References Cited

U.S. PATENT DOCUMENTS

| | | | |
|---|---|---|---|
| 3,619,300 A | 11/1971 | Heller et al. | |
| 5,389,453 A | 2/1995 | Toyose et al. | |

(Continued)

FOREIGN PATENT DOCUMENTS

| | | |
|---|---|---|
| JP | S59159987 | 9/1984 |
| JP | S62182286 | 8/1987 |

(Continued)

OTHER PUBLICATIONS

Narayanan et al. ("Effect of surfactants on the growth and crystal habit of zinc phosphate coating." Transactions of the IMF 71.1 (1993): 37-40). (Year: 1993).*

(Continued)

*Primary Examiner* — Anthony J Zimmer
*Assistant Examiner* — Ricardo D Morales
(74) *Attorney, Agent, or Firm* — Mark M. Friedman (57) ABSTRACT

A method for providing composite phosphate conversion crystal coating, including the steps of: mixing powdered materials with metal oxide particles, thereby providing a composite metal oxide powder including particles of at least one additional powdered material, the at least one additional powdered material providing additional functionality to the phosphate conversion crystal coating; pretreating a substrate by depositing particles of the composite metal oxide powder on the substrate; treating the substrate with a phosphate coating solution, resulting in the composite phosphate conversion crystal coating forming on the substrate which contains fixed particles of the at least one additional powdered material.

12 Claims, 5 Drawing Sheets

(51) Int. Cl.
C23C 30/00 (2006.01)
C23C 24/00 (2006.01)
C23C 22/07 (2006.01)
C09C 3/06 (2006.01)

(52) U.S. Cl.
CPC .......... *C23C 30/00* (2013.01); *C01P 2004/03* (2013.01); *C09C 3/063* (2013.01)

(56) References Cited

U.S. PATENT DOCUMENTS

| | | | |
|---|---|---|---|
| 5,429,881 A | 7/1995 | Aono et al. | |
| 6,214,132 B1* | 4/2001 | Nakayama | C23C 22/78 106/14.12 |
| 6,276,400 B1* | 8/2001 | Jackson | B05C 19/025 138/137 |
| 6,280,798 B1* | 8/2001 | Ring | B05C 19/025 427/459 |
| 6,562,474 B1 | 5/2003 | Yoshimi et al. | |
| 2004/0112471 A1 | 6/2004 | Moriya et al. | |
| 2012/0160372 A1* | 6/2012 | Inbe | C09D 5/002 148/240 |

FOREIGN PATENT DOCUMENTS

| | | |
|---|---|---|
| JP | H10140371 | 5/1998 |
| WO | 2007117043 | 10/2007 |
| WO | 2009057054 | 5/2009 |
| WO | WO-2009057054 A2 * | 5/2009 .............. C09D 5/10 |
| WO | 2015098653 | 7/2015 |

OTHER PUBLICATIONS

Van Phuong et al. ("Effects of Zn2+ concentration and pH on the zinc phosphate conversion coatings on AZ31 magnesium alloy." Corrosion science 74 (2013): 314-322). (Year: 2013).*
Jegannathan S. et al. "Performance of Zink Phosphate Coating Obtained by Cathodic Electrochemical Treatment in Accelerated Corrosion Test" Electrochimica Acta, vol. 51, Issue 2, Oct. 10, 2005, pp. 247-256, ISSN 0013-4686, http://dx.doi.org/10.1016/j.electacta.2005.04.020.
Ogle, K., et al. "Phosphate Conversion Coatings, Corrosion; Fundamentals, Testing and Protection" vol. 13a, ASM Handbook, ASM International, 2003, p. 712-719.
3M "Custom Coating Guide for Application of Scotchkote Fusion Bonded Epoxy Coatings" 2006. 08-6111-8373-4-B.
U. S. Army TACOM-ARDEC "Phosphate Coating, Heavy, Manganese or Zink Base" MIL-DTL-16232G. Oct. 7, 2000.
"Surface Engineering" Vo 5, ASM Handbook, ASM International, 1994, ISBN: 978-0-87170-384-2.
Fig. 1 as Prior Art taken from Pragochema spol. s r.o. http://www.pragochema.cz/?start=1&lan=en.
John Donofrio, "zinc phosphating" Metal Finishing vol. 98, Issue 6, 2000. pp. 57-58, 60-73, Elsevier. [abstract] And published again pp. 29-45, metal finishing, 2012, organic finishing guidebook, the essential resource for painter and powder coaters, Elsevier [full article].

* cited by examiner

SEM image: metallic Zinc powder particles, fixed to composite phosphate coating.

FIG. 4

Zinc Phosphate composite coating after eight hours in NSST chamber. No he substrate corrosion products are evident

FIG. 5

After Pull-Off Adhesion test of powder coated samples: no failures occurred at the paint–coating interface.

FIG. 6

SEM image: $MoS_2$ powder particles, fixed to composite phosphate coating.

FIG. 7

SEM image: MoS$_2$ powder particles fixed on Zinc phosphate coating were smudged on the sample surface that is a regular phenomena for such kinds of dry lubricants with layered crystal structure.

FIG. 8

Steel stamped parts coated with colored Zinc Phosphate coatings

COMPOSITE PHOSPHATE COATINGS

FIELD OF THE INVENTION

The present invention relates to a method and system for providing composite phosphate coating.

BACKGROUND OF THE INVENTION

Phosphating is used in the metalworking industry to treat substrates like iron, steel, galvanized steel, aluminum, copper, and magnesium and its alloys, mainly as a base for paints, organic and inorganic coatings to increase corrosion resistance and paint and coatings adhesion. Alternatively or additionally, in case of the coatings with dry lubricants, the phosphating is used for wear resistance, seizing prevention, low friction application etc. The cold forming of steel would not be economically feasible without phosphating as a lubrifying film. Other applications include providing temporary corrosion resistance for unpainted metal and electrical resistance.

SUMMARY OF THE INVENTION

The innovative composite coatings may not only to improve significantly the above properties, in comparison to regular phosphate coatings, but also allow for the design of a wide range of composite phosphate coatings with very unique properties. Regular phosphate coatings cannot provide these unique properties.

There is disclosed herein the newest generation of phosphate coatings, namely composite phosphate coatings. With composite phosphate coatings the phosphate compounds are presented as a matrix with added particles of different powdered materials which are fixed in the matrix. Such coatings provide the regular properties of known, non-composite coatings with additional functional properties. The nature of the additional functional properties depend on the types of added powdered materials and the properties of the particulate materials.

The innovative methods for forming the phosphate composite coatings and enhanced functionality of the resulting coatings are exemplarily illustrated below in the discussion of an exemplary Zinc-Zinc Phosphate composite coating (alternatively referred to as composite Zinc-Zinc Phosphate crystal coating).

According to the present invention there is provided a method for providing composite phosphate conversion crystal coating, the method including the steps of: mixing powdered materials with metal oxide particles, thereby providing a composite metal oxide powder including particles of at least one additional powdered material, the at least one additional powdered material providing additional functionality to the phosphate conversion crystal coating; pretreating a substrate by depositing particles of the composite metal oxide powder on the substrate; treating the substrate with a phosphate coating solution, resulting in the composite phosphate conversion crystal coating forming on the substrate which contains fixed particles of the at least one additional powdered material.

According to further features in preferred embodiments of the invention described below the metal oxide particles are selected from the group comprising: CaO, ZnO, MnO, NiO, FeO and combinations thereof.

According to still further features in the described preferred embodiments a mixture of the metal oxide and the at least one additional powdered material are deposited on the substrate in a quantity of between 0.5 and 100 g/m2.

According to further features a largest dimension of any of the metal oxide particles is less than 2 µm.

According to further features a largest dimension of any particles of the at least one additional powdered material is less than 10 µm.

According to further features the phosphate coating solution comprises phosphates selected from the group comprising: Zinc Phosphates, Manganese Phosphates, Calcium Phosphates and mixtures thereof; wherein the phosphate coating solution is devoid of any additional common components used in legacy phosphate coating process, the common components selected from the group comprising: alkalis, nitric acid, nitric acid salts, phosphate coatings crystals refining materials.

In cases where the added powdered materials particles are no wetted by phosphate coating solution suitable Surfactants are added with a value of up to 3 mass %. The suitable type of surfactant and its concentration in phosphate coating solutions have to be found experimentally for each kind of the additional powdered material. According to further features the phosphate coating solutions further comprise surfactants for increased wettability. According to further features the surfactants have a value of up to 3% mass.

According to further features the phosphate coating solution comprising Zinc Phosphates reacts with the metal oxide particles at a temperature of up to 35° C.

According to further features the phosphate coating solution comprising Manganese Phosphates reacts with the metal oxide particles at a temperature of up to 70° C. According to further features the phosphate coating solution has a pH range of between 2.2 and 2.7. According to further features the phosphate coating solution has a phosphate density of between 1.03 and 1.08 kg/l.

Definitions and Nomenclature

It is also to be understood that the terminology used herein is for the purpose of describing particular exemplary embodiments only, and is not intended to be limiting in any fashion, and in particular with respect to the doctrine of equivalents.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following terms, phrases and nomenclature are defined for clarity. Unless defined otherwise, all technical terms used herein have the same meaning as commonly understood by one skilled in the art to which this subject matter belongs.

As used herein, the term "phosphating" and variations thereof refers to surface pretreatment used on ferrous or aluminum parts that provides a very thin crystalline film that enhances both corrosion resistance and adhesion.

As used herein, the term "phosphate coating solution" refers to a solution of phosphoric acid and phosphate salts.

As used herein, the term "phosphate coating" refers to a coating formed from a phosphate coating solution. The name of the phosphate coating is per the metal used in the phosphate coating solution. For example: Zinc Phosphate coating is formed from a Zinc Phosphate coating solution.

As used herein, the term "composite material" (also called a "composition material" or shortened to the commonly used name "composite") refers a material made from two or more constituent materials with significantly different physical or chemical properties that, when combined, produce a material with characteristics different from the individual components.

As used herein, the term "composite coating" refers to the coating made from the composite material.

As used herein, the term "phosphate composite coating" refers to a coating material formed from phosphates, which are used as a matrix, and to which particles of one or more other materials is added.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The description below relates primarily to Zinc Phosphate and composite Zinc-Zinc Phosphate crystal coating. It is made clear that the aforementioned compounds and coatings, as well as other compounds and coatings that are detailed herein are merely exemplary and not intended to be limiting in any way. As such, the principles of the present invention encompass all relevant compounds and compositions as may be employed by one skilled in the art in view of the following description.

Zinc and other known crystalline Phosphate Conversion coatings may contain a number of different phosphate compounds. The composition of the phosphate coatings is influenced by a number of factors, such as, for example, the method of application (e.g. spray or dip), the degree of agitation of the bath, the bath chemistry, bath temperature, the type and quantity of the accelerator as well as the presence of other metal ions in the bath solution. The crystals of the phosphate coating contain the main metal of the phosphate salt used in the phosphate coating solution, but in some cases may also comprise one or more additional elements.

In general, Zinc coatings are used for corrosion protection of iron and iron alloys as sacrificial coatings. There is presently disclosed an exemplary composite coating containing Zinc and a Zinc Phosphate matrix. The combination of the Zinc Phosphate matrix, together with the sacrificial corrosion protection characteristic of the Zinc particles that are included in the solution, provide better corrosion protection properties than regular Zinc Phosphate conversion crystal coatings. The same principles can be employed with Manganese Phosphate, Iron Phosphate, Calcium Phosphate and all other types of phosphate coatings.

The composite coating may be further used as a base for additional coatings, topcoats and paints.

General Procedure for Forming the Innovative Coating:
1. A metal part is pretreated with Zinc powder particles which adhere, or are made to adhere to the surface of the metal substrate.
2. Following the pretreatment of the part with Zinc powder, the part is treated with a Zinc Phosphate coating solution.
3. The metal elements in the Zinc powder particles deposited on the surface of the metal part react with the solution and Zinc Phosphate coating is formed on the substrate and on the Zinc particles as well, resulting in the creation of a complete Zinc Phosphate crystal conversion coating.

The Phosphate layer that forms on the surface also holds the Zinc powder particles on the substrate surface, thereby forming a composite coating that contains metallic Zinc particles in the permanent Zinc Phosphate coating layer (i.e. the coating includes an additional buffer of Zinc powder particles between the Zinc phosphate coating and the substrate).

The main issue for discussion is the deposition of Zinc powder particles on the surfaces of the treated parts, before commencing the phosphating operation. In preferred embodiments, the particle size of the Zinc powder is from 0.5 μm to 20 μm. In more preferred embodiments, the powder particles are of an optimal particle size for corrosion protection, which is in a range between 4 and 7 μm. Particles that are 20 μm or larger, are generally too big and/or heavy to properly adhere to the substrate surface and therefore the deposited powder particles will not adhere sufficiently to the substrate. Particles that are smaller than 0.5 μm almost completely react with the phosphate solution, and as a result, the sacrificial corrosion protection effect is minor as there is not sufficient Zinc left on the substrate for the desired corrosion protection discussed above.

One exemplary technique to improve the adhesiveness of the Zinc powder particles (of a preferred size) is by coating the Zinc powder particles with a different, ultrafine, powdered material. By preliminarily depositing a preferred ultrafine powdered material on the surfaces of the Zinc powder particles, a large portion of the Zinc powdered particles (which are preferably between 4-7 μm in size) will now have ultrafine particles deposited thereon and these ultrafine particles increase the adhesiveness of the Zinc powdered particles to the metal substrate.

In one preferred embodiment, the ultrafine material is Zinc Oxide (ZnO). Zinc Oxide (ZnO) was found to be an optimal material for the aforementioned purpose, particularly when the Zinc Oxide (ZnO) powder particles have a size of less than 1 μm. In more preferred embodiments, the ZnO particle size is in a range between approximately 0.20-0.25 μm. This size was found to be optimal from both a technical perspective as well as an economical perspective. In other embodiments, the ultrafine particle size is approximately 0.10 μm or 0.05 μm, which are both viable sizes. In still other embodiments, the size of the particles is even smaller.

One exemplary advantage of coating the Zinc particles with ultrafine Zinc Oxide particles is that ZnO is a material that also reacts with Phosphate coating solution to create the same Zinc Phosphate crystals. Another exemplary advantage is that by using the ZnO material to react with the Phosphate solution the unwanted reaction of the metallic Zinc powder particles is minimized, thereby increasing the amount of metallic Zinc remaining in the final innovative composite coating. Furthermore, ZnO does not add ions of "foreign" materials to Zinc phosphate solution. In other cases where different materials are used to coat the Zinc particles, the ions of foreign materials (i.e. the materials other than ZnO) collect in the solution and affect the efficacy of the phosphate solution. Over time the solution becomes unusable and must be thrown out and a new batch of solution prepared. As mentioned, ZnO does not cause instability in the Zinc phosphate coating solution.

The principles and operation of method and system of phosphate coating according to the present invention may be better understood with reference to the drawings and the accompanying description.

Figure 1:
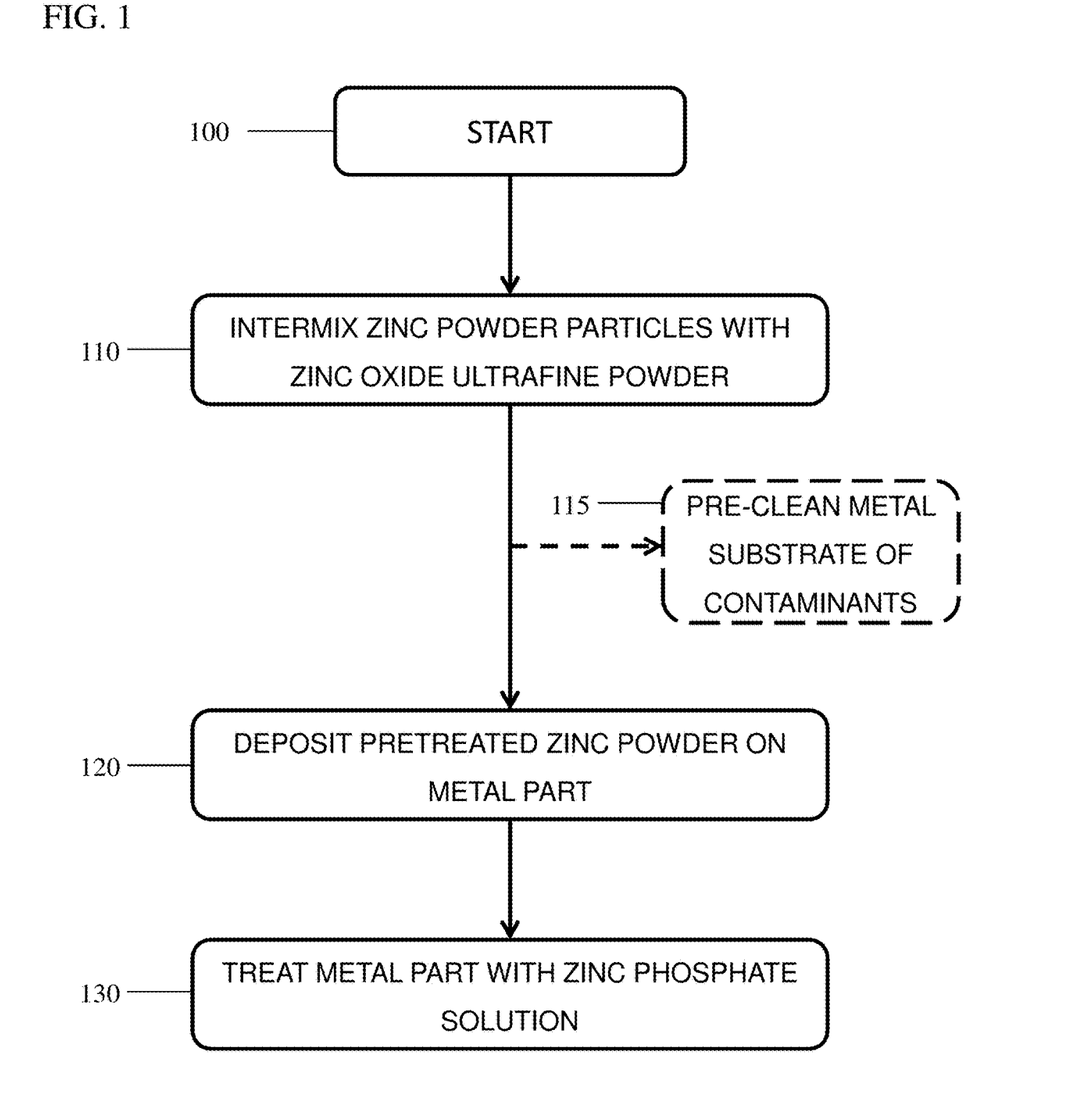
FIG. 1 is a flow diagram of an exemplary process for forming and applying a composite Zinc phosphate crystal coating.

FIG. 1 illustrates a flow diagram of an exemplary process for forming and applying a composite Zinc phosphate crystal coating. The flow diagram begins at block 100.

Block 110—Before depositing the Zn powder on the metal parts, the Zn metallic powder is thoroughly mixed with ultrafine ZnO powder at a mass ratio of ZnO:Zn in a range between 1:2-1:10.

At next step—block 120—the pretreated Zn powder is deposited on the surface of metal part. In preferred embodiments, an aerosol creation technology is employed to disperse the powder on the metal part. In a preferred but exemplary embodiment, the aerosol creation technology employed is a fluidized bed.

Of course, the metal parts have to be clean of rust, oil and other contaminants before Zn powder deposition. This step is shown in block 115 and indicated to be an optional step by the dashed lines. The step is optional as it may not be necessary to pre-clean the metal parts. For example, newly manufactured part are likely to be free of oil, rust and most other contaminants.

As indicated in block 130, after the Zn powder deposition, the parts are treated (e.g. by immersion or spray) with the Zinc Phosphate solution, in order to form the innovative composite Zinc-Zinc Phosphate crystal coating.

Some exemplary advantages of the immediate innovative method and product include the fact that there no special requirements for the Zinc Phosphate coating solution chemical composition. Furthermore, there are no special requirements for the Zinc Phosphate coating process.

The method described above for Zinc-Zinc Phosphate coating can be likewise applied to simple Zinc and Manganese phosphate coatings but can also be applied to form more complicated compositions such as, but not limited to, Zn—Ca, Zn—Ni, Zn—Mn, etc. as well as more complicated compounds.

Phosphates formed from the exemplary phosphate coating solutions described above, as well as similar phosphate coating solutions, may be used as the matrixes for forming a wide range of composite coatings. To this end, the surfaces of the treated parts have to have powders deposited thereon of different oxides of metals such as Zinc, Manganese, Calcium, Iron, Nickel and others, and also different powdered materials: metals, alloys, inorganic, organic, organosilicates and any others.

Some examples of such composite coatings include coatings that may contain zinc additives for improving corrosion protection, molybdenum disulfide for low friction and different pigments for coloring the coating. Besides for Zinc, adding metallic powders such as Silicium (Si), Magnesium (Mg), Aluminum (Al) and others increases the corrosion protection of the coating.

Similarly, additives can be included to improve adhesion of powdered and liquid paints to the coated substrates as well as improving corrosion protection. Additives can improve adhesion of molded rubber or plastic to the coating of metallic inserts.

Other options for optimization using tailored additives include, but are not limited to, optimizing electro-magnetic coating parameters, thermo-conductivity, surface tension, surface infra-red radiation emission, increasing or reducing conductivity, introducing nano-particles, sub-nano-particles etc.

The effectiveness of the coatings is such that the coatings increase in thickness, in some cases even up to 100 $g/m^2$ or higher. The problem is that multi-component coatings of this kind have to have enough strength for successful operation.

The coating process with the compositions of the present invention cannot successfully occur with all kinds of additive materials, but only with metals and their compounds, which are pickled by the coating liquid. For example, most of non-metallic and organic materials are not pickled by the phosphate solution and as a result, the phosphate coating does not form on these (non-metallic and organic) surfaces.

On the other hand, non-pickled additive particles may amalgamate/fuse with, or adhere to, pickled additive particles or with the primary deposited materials, different oxides of metals such as Zinc, Manganese, Calcium, Iron and others, which are used to form the phosphate coating. In such a case—where the non-pickled additive particles amalgamate with the phosphates formed from pickled particles materials—the resulting composite phosphate coating has a strong structure. Therefore, in a preferred embodiment, non-pickled additive particles amalgamate/join/fuse with pickled additive particles and/or the primary deposited materials to form a composite phosphate coating with a strong structure.

Another requirement for the formation of uniform, continuous coating structure is a high degree of wettability of the phosphate coating liquid with the surfaces of the deposited materials. When the wetting is ideal, there is a high degree of interaction between the liquid solution and the surfaces of the deposited materials such that phosphate coating crystals are formed on all of the surfaces of the deposited additive particles, as well as on the substrate.

Usually, metal and oxide surfaces (i.e. of the deposited materials) are wetted with the phosphate coating liquids. Most organic or silica-organic materials have a low wettability with such solutions.

When using composite coating additive materials with low wettability with phosphate coating solutions, it is necessary to adapt the solution with other kinds of additives and/or suitable surfactants (surface active agents). It is also possible to treat the additive particles with the surfactants. In some cases it is necessary to use both methods. As such, in preferred embodiments, the phosphate coating solution is enhanced with additives and/or surfactants to increase the surface contact between the phosphate coating solution and the surfaces of additive material particles, the substrate being treated or both. In other preferred embodiments, the particles of the additive materials are treated with surfactants. In still other embodiments, the both the solution and the particles are treated with surfactants and/or additives that increase the surface area on the additive particles and/or substrate that are in contact with the liquid of the coating solution.

A suitable surfactant may be solid, liquid or gas, and the selection of the surfactant is preferably based on the following rules:

1. The surfactant has no noticeable influence on the phosphate liquid properties, i.e. it does not, for example, reduce the activity of the phosphate liquid, increase the optimal process temperature, etc.
2. The surfactant has no noticeable influence on the formed coating properties, such as uniformity, porosity, adhesion, etc.

According to the discussion above, the surfactants need to be solid or liquid materials that are soluble in phosphate coating solutions or liquids. The suitable type of surfactant and the concentration of the surfactant in the phosphate coating solution has to be found experimentally, for each kind of the powdered material with which the target part is pretreated.

Figure 2:
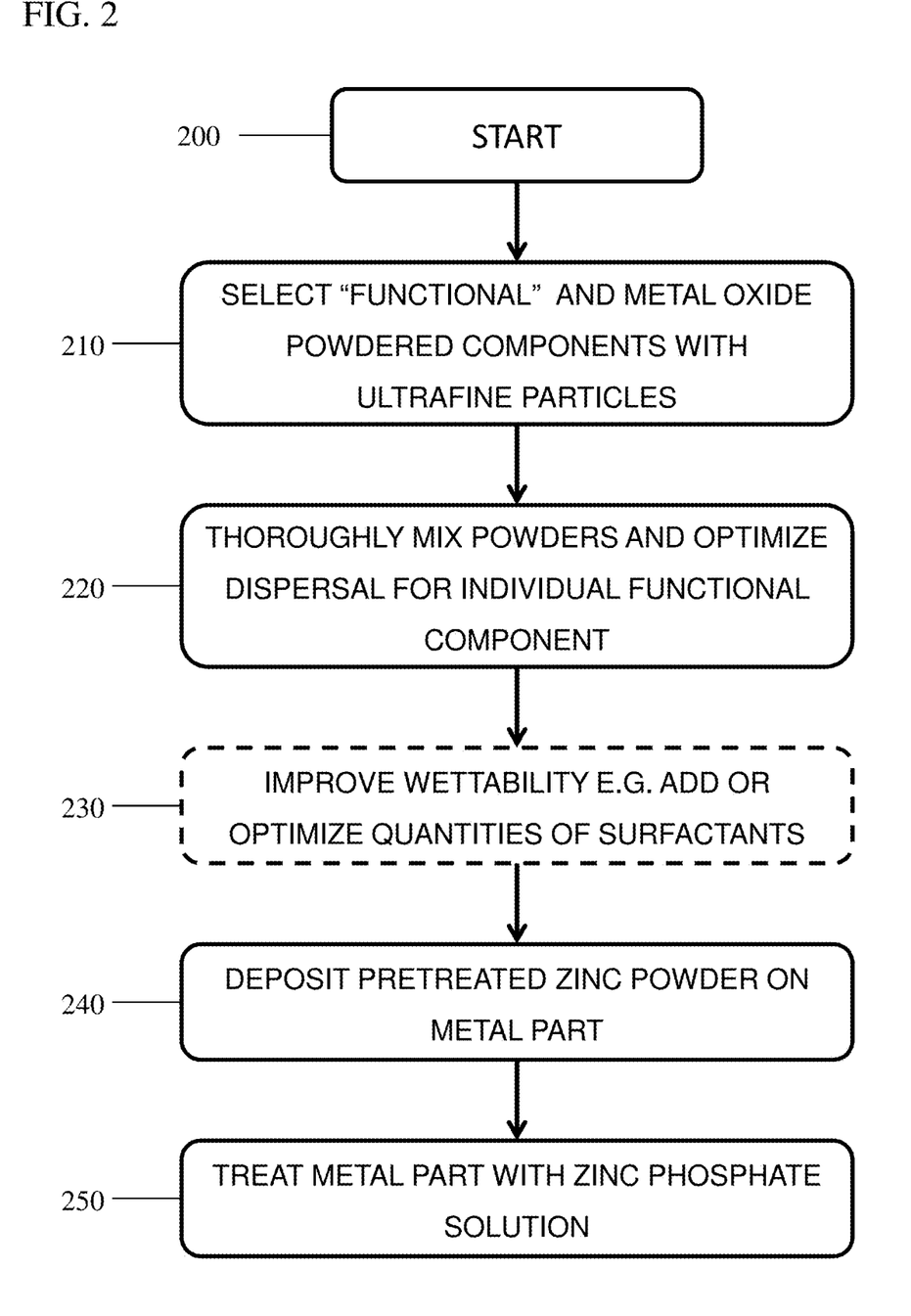
FIG. 2 is a flow diagram of a second exemplary embodiment of the innovative process.

FIG. 2 is a flow diagram of a second exemplary embodiment of the innovative process. The process starts at Block 200.

At Block 210, suitable powdered components are selected for deposition coating of the treated parts based on the desired properties of the coating. The list of components has to include fine "functional" and metal oxide powders with a grain size of no more than 0.5 μm. The at least one additional material augments the pretreatment powder. The resulting mixture or composite mixture is used as a pretreatment for the target part.

At Block 220 the dispersion of the powdered "functional" component has to be optimized for each type of the "functional" materials individually, via experimentation. The various powdered components have to be mixed thoroughly and homogeneously before deposition of the mixture on the target substrate.

At optional Block 230 (designated as optional by dashed lines), if it is necessary to improve wettability of the components deposited by the phosphate coating liquid, then more suitable components must be substituted and/or the quantities of surfactants must be altered for optimization, via experimentation.

At Block 240, the prepared mixture of surface modification components are deposited on the surface of the target parts before commencing the phosphate coating operation.

At Block 250, the immediate phosphate coating operation is the same as the regular phosphate coating operation.

The functional, additive materials are selected so provide additional functional properties to the coating. An exemplary, non-exhaustive, list of potential augmentations or added functional properties include: coloring the coating with regular and/or fluorescent pigments (organic and inorganic); improved corrosion protection with additive metallic particles and/or inhibitors; low friction (for wear resistance) and/or controlled friction coefficient (e.g. for high strength bolts, etc.) with adding organic or inorganic particles of dry lubricants or combinations thereof; increasing or reducing electric conductivity by adding conductive or insulation materials; increasing or reducing thermal conductivity by adding thermo-conductive or thermo-insulation materials; electron emission variation; surface electrification; absorption, emission or reflection of different electromagnetic waves, such as infrared, high-frequency or others.

Equipment and Control Methods

In experiments, the following equipment was used:

1. A fluidized bed aerosol generator was used. The generator value is ~0.3 $m^3$ and operation value ~0.25 $m^3$. The quantity of modification material varied from 0.1 to 3 kg, for varying aerosol concentrations. The optimal period for surface modification of the treated samples was found to be three minutes.
2. The concentration of deposited aerosol particles was measured by weighing the treated samples before and after deposition. A semi-analytical scale by Ragway Company, Poland, having an accuracy of 0.001 g was used for weighing samples.
3. The density of the solutions was measured with suitable hydrometers have an accuracy of 0.01 kg/l.
4. The acidity of the solutions was measured with a Milwaukee pH-meter P-600, by Milwaukee Instruments, Inc., Rocky Mount, N.C., USA, with glass electrode, having an accuracy of 0.01.
5. The phosphate coating thickness on the treated samples was measured by weighing of the coated samples after coating and after coating stripping according the MIL-DTL-16232G specification.
6. Corrosion resistance of coatings in neutral salt spray cabinets was performed according the ASTM B117-02 specification.
7. The Pull-Off Strength Test of powder coating was performed per ASTM D4541 specification with using Type V portable adhesion tester. Were used the standard dollies 20 mm (0.78 in.) and a 20 kN manual hydraulic tensile adhesion tester GM04/20 kN of DFD® INSTRUMENTS.
8. The static coefficients of friction was measured by the COFP01 Inclined Surface Coefficient of Friction Tester of Labthink International, Inc.

Used Materials

1. Phosphoric acid 85%, food grade, produced by Rotem Ampert Negev Ltd.
2. Zinc oxide, Gold Seal, was supplied by Numinor Chemical Industries Ltd.
3. Zinc powder, UltraPure®, Product Code: NZD UP #6®, was supplied by Numinor Chemical Industries Ltd.
4. Pigments, organic and inorganic, were supplied by Myko Engineering Ltd.
5. Molybdenum Disulfide ($MoS_2$) powder type T/F, was supplied by Petrus Chemicals & Materials Ltd.

Degreasing alkali liquid UNICLEAN PT-1000, as a surfactant, supplied by Petrotech Indistries Ltd.

EXEMPLARY APPLICATIONS

Example No. 1—Improvement of Corrosion Resistance

Experiments were performed on 60×60×3 mm carbon steel plates. The surfaces of five plates were pretreated with Zinc Oxide powder only and the surfaces of five other plates were treated with a mixture of powders as follows: 30% (mass) of Zinc Oxide and 70% of metallic Zinc powder. Both kinds of samples were coated in the same Zinc Phosphate coating liquid at 30° C., for ten minutes.

The Zinc Phosphate conversion coating that formed on the first batch of samples (Zinc Oxide pretreatment) had a weight of 14±2 $g/m^2$ and met the MIL-DTL-16232G specification requirements for heavy Zinc Phosphate coating.

Figure 3:
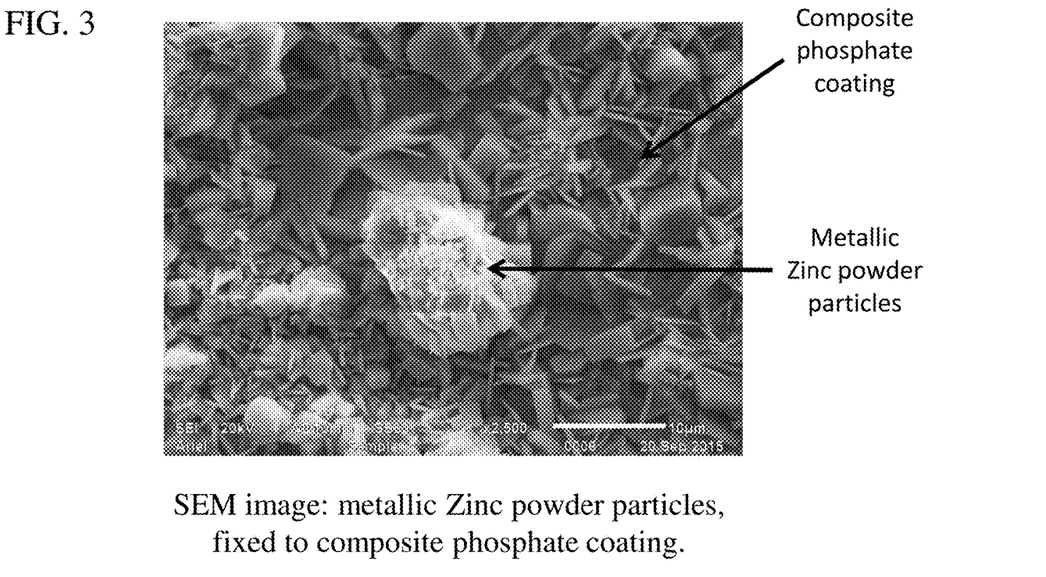
FIG. 3 is an SEM image of the composite phosphate crystal coating on the surface of a carbon steel plate.

The composite Zinc-Zinc phosphate coating that formed on the second batch of samples had a weight of 13±2 g/m². The surface of this composite coating was evaluated with a Scanning Electron Microscope (SEM). FIG. 3 is an SEM image of the composite phosphate crystal coating on the surface of a carbon steel plate. In the image it is possible to see Metallic Zinc powder particles fixed to composite phosphate coating.

Both types of samples were tested in a neutral salt spray test (NSST) cabinet. The substrate corrosion products were recognized on the samples with regular Zinc Phosphate coating after four hours in the chamber (the MIL-DTL-16232G specification requires two hours minimum).

Figure 4:
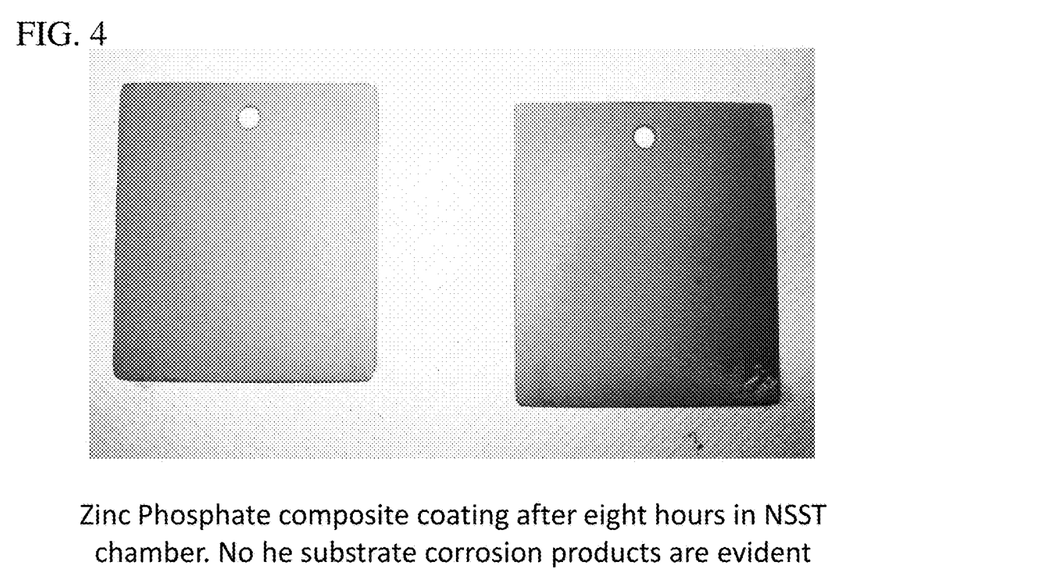
FIG. 4 is an image of two sample plates with Zinc-Zinc Phosphate composite coating after eight hours in the NSS chamber

FIG. 4 is an image of two sample plates with Zinc-Zinc Phosphate composite coating after eight hours in the NSS chamber. Practically no corrosion products are visible on the samples, even after being in the NSS chamber for double the amount of time the samples with the regular Zinc Phosphate coating were in.

It is therefore clear that the Zinc-Zinc Phosphate composite coating provides better corrosion resistance in the NSST cabinet than the Zinc Phosphate coating that lacked the additional metallic Zinc particles.

Example No. 2—Pull-Off Strength

Figure 5:
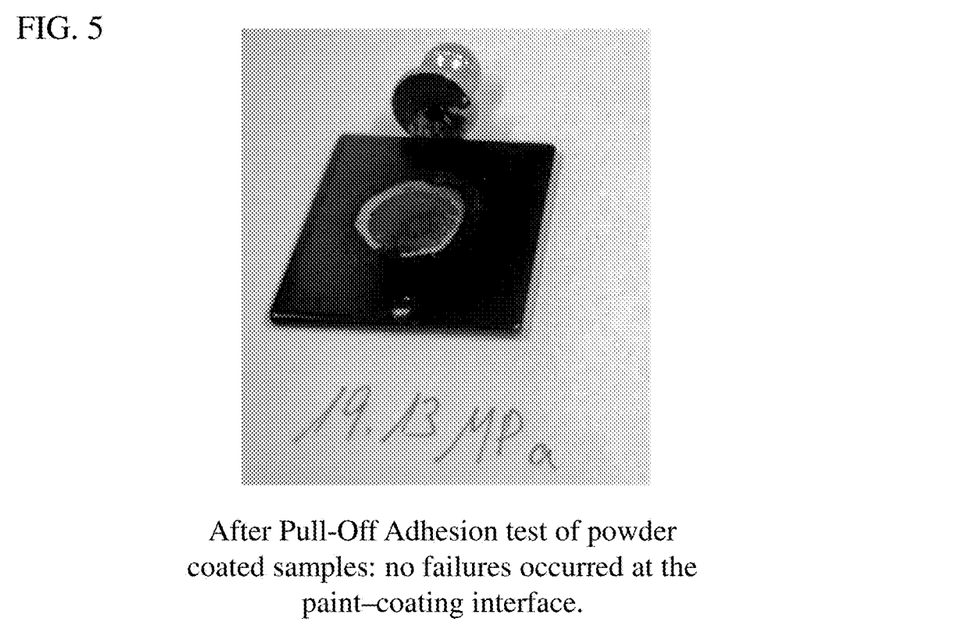
FIG. 5 is an image of a test sample after the adhered member has been pulled off a carbon steel plate coated with an innovative composite phosphate coating.

Two similar groups of five samples each with Zinc Phosphate and Zinc-Zinc Phosphate composite coating were coated with powder coating in two layers: the first layer epoxy and the upper layer polyester. The samples were tested for Pull-Off Strength. FIG. 5 is an image of a test sample after the adhered member has been pulled off the test sample which is a carbon steel plate coated with an innovative composite phosphate coating. The adhesion strength is recorded as 19.13 MPa. The value of adhesion for all samples in both groups varied from 19 to 23 MPa. In all the tests there was not one single failure at the paint—coating interface. The conclusion from the tests is that Zinc-Zinc Phosphate composite coating has a similar powder paint adhesion rate as Zinc Phosphate coating.

Example No. 3—Friction Coefficient Reduction

Figure 6:
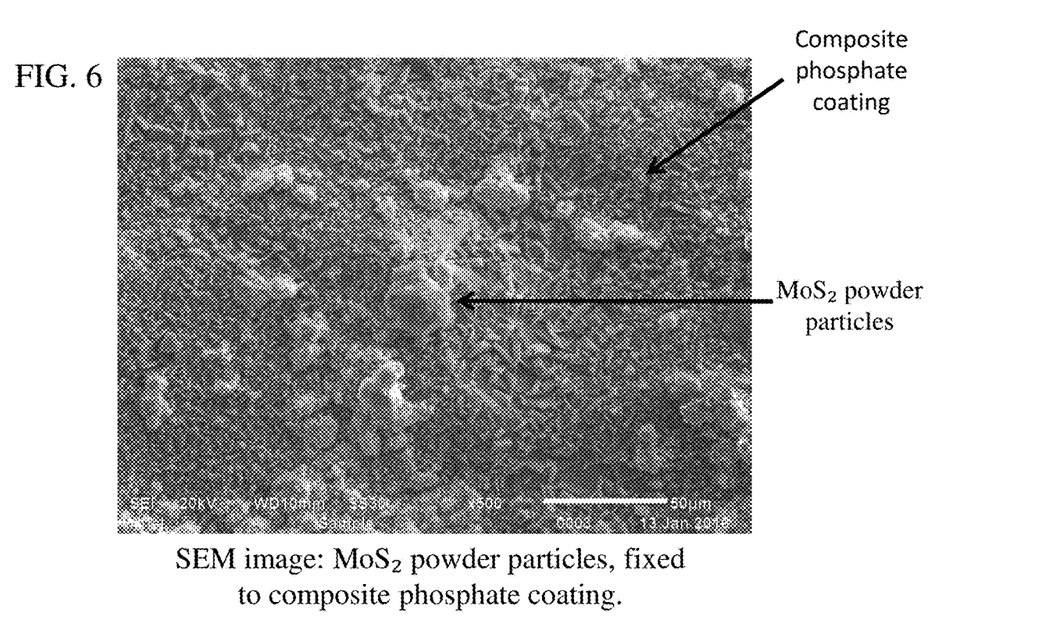
FIG. 6 is an SEM image of the composite $MoS_2$-Zinc-Zinc phosphate coating.

Experiments were performed on carbon steel discs with 50 mm diameter and 6 mm thickness. Surfaces of five discs were pretreated with Zinc oxide powder only while the surfaces of another five discs were treated with a mixture of powders as follows: 45% (mass) of Zinc Oxide and 35% of metallic Zinc powder and 20% of Molybdenum Disulfide ($MoS_2$) powder as dry lubricant. Both sample groups were coated in the same Zinc Phosphate coating liquid at 30° C. for 10 minutes. 1% (mass) of surfactant was added to the phosphate coating liquid. The Zinc Phosphate conversion coating that formed on the first set of samples (Zinc oxide only) had a weight of 15±2 g/m². The composite $MoS_2$-Zinc-Zinc phosphate coating that formed on the second set of samples had a weight of 15±3 g/m². The surface of the composite coating was evaluated with Scanning Electron Microscope (SEM). FIG. 6 is an SEM image of the composite $MoS_2$-Zinc-Zinc phosphate coating. $MoS_2$ powder particles can be seen fixed on the Zinc phosphate coating.

Both kinds of coated samples were tested for static friction coefficient. For Zinc phosphate coating static friction coefficient was 0.42±0.05 and the static friction coefficient for the composite coating was 0.18±0.03. It is therefore evident that the addition of $MoS_2$ dry lubricant powder significantly reduced the static friction coefficient of the Zinc Phosphate coating.

Figure 7:
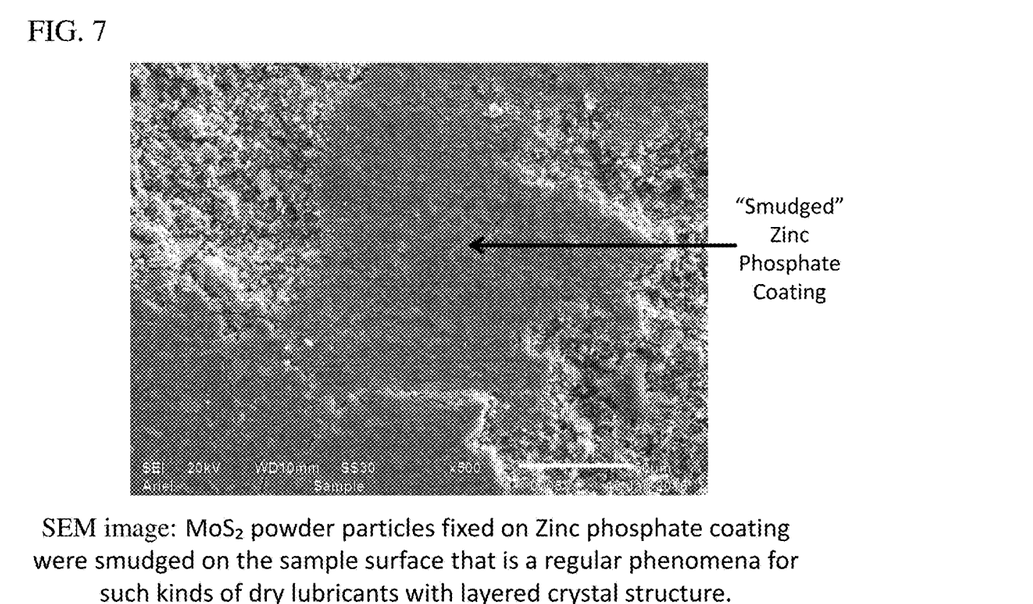
FIG. 7 is an SEM image of the surface of the composite coating.

FIG. 7 is an SEM image of the surface of the composite coating after the above-mentioned test as examined a second time with the Scanning Electron Microscope (SEM). It is possible to see the $MoS_2$ powder particles that were fixed on Zinc phosphate coating were smudged on the sample surface. Smudging, as shown in the image, is a regular phenomenon with dry lubricants of this type, when dealing with a layered crystal structure.

Example No. 4—Zinc Phosphate Color Coating

Color pigments, either organic, inorganic or both, may be mixed with Zinc Oxide powder. In preferred embodiments, pigments in a range from about 3% to 15% (mass) are added, depending on the type of pigment. The pigment(s) can be added to the pretreatment and/or into the phosphate coating liquid.

Figure 8:
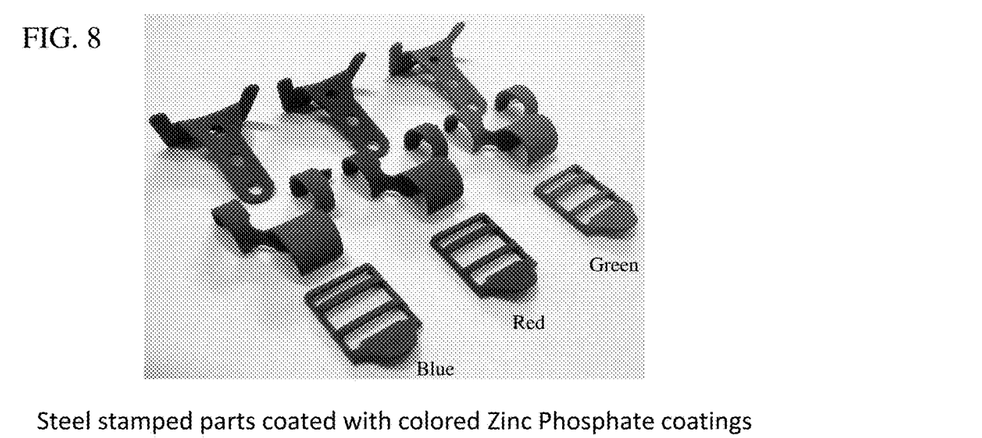
FIG. 8 is an image of low alloy steel stamped parts coated with colored Zinc Phosphate coatings.

FIG. 8 is an image of low alloy steel stamped parts coated with colored Zinc Phosphate coatings. In the Figure there are three sets of identical steel parts, each set from top to bottom includes a tongue piece, a curved piece and a buckle piece. In the original image, the left hand set is blue in color, the middle is a red-iron color and the right hand set is green. The colored parts are the results of treatment with zinc phosphate colored coatings. The inorganic pigments used in the treatments were: a) Black Iron Oxide $Fe_3O_4$; b) Red Iron Oxide $Fe_2O_3$; c) Blue Ultramarine Complex mineral containing small amounts of polysulfides; d) Green Chromium (III) Oxide $Cr_2O_3$.

The organic pigments (insoluble in water) used in the treatments were: a) Red Quinacrodone, $C_{20}H_{12}N_2O_2$; b) Green Phthalocyanine, a complex of copper with chlorinatedphthalocyanine; c) Blue Phthalocyanine, a complex of copper with phthalocyanine. In all cases, as initially shown in the images, colored Zinc Phosphate coatings were formed.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for providing composite phosphate conversion crystal coating, the method comprising the steps of:
   mixing metal oxide powder with at least one additional powdered material, thereby providing a mixture of said metal oxide powder and said at least one additional powdered material, said at least one additional powdered material providing additional properties to the phosphate conversion crystal coating, wherein said metal oxide powder is comprised of ultafine particles;
   pretreating a substrate in a dry process by depositing particles of said mixture of said metal oxide powder and said at least one additional powdered material on said substrate;
   treating said substrate with a phosphate coating solution, resulting in the composite phosphate conversion crystal coating forming on said substrate which contains fixed particles of said at least one additional powdered material.

2. The method of claim 1, wherein said metal oxide powder is selected from the group comprising: CaO, ZnO, MnO, NiO, FeO and combinations thereof.

3. The method of claim 1, wherein said mixture of said metal oxide and said at least one additional powdered material is deposited on said substrate in a quantity of between 0.5 and 100 g/m2.

4. The method of claim 1, wherein a largest dimension of any particle of said metal oxide powder is less than 2 µm.

5. The method of claim 1, wherein a largest dimension of any particles of said at least one additional powdered material is less than 10 µm.

6. The method of claim 1, wherein said phosphate coating solution comprises phosphates selected from the group comprising: Zinc Phosphates, Manganese Phosphates, Calcium Phosphates and mixtures thereof; wherein said phosphate coating solution is devoid of any additional common components used in legacy phosphate coating process, said common components selected from the group comprising: alkalis, nitric acid, nitric acid salts, phosphate coatings crystals refining materials.

7. The method of claim 6, wherein said phosphate coating solutions further comprise surfactants for increased wettability.

8. The method of claim 7, wherein said surfactants have a value of up to 3% mass.

9. The method of claim 6, wherein said phosphate coating solution comprising Zinc Phosphates reacts with said metal oxide powder when said phosphate coating solution is at a temperature of up to 35° C.

10. The method of claim 6, wherein said phosphate coating solution comprising Manganese Phosphates reacts with said metal oxide powder when said phosphate coating solution is at a temperature of up to 70° C.

11. The method of claim 1, wherein said phosphate coating solution has a pH range of between 2.2 and 2.7.

12. The method of claim 1, wherein said phosphate coating solution has a phosphate density of between 1.03 and 1.08 kg/l.

* * * * *